(12) United States Patent
Lutz, Jr.

(10) Patent No.: US 6,483,029 B1
(45) Date of Patent: Nov. 19, 2002

(54) CONVERTIBLE TELECOMMUNICATION CHASSIS AND METHOD FOR CONVERTING SAME

(75) Inventor: Ronald D. Lutz, Jr., Round Rock, TX (US)

(73) Assignee: General Bandwidth Inc., Austin, TX (US)

( * ) Notice: Subject to any disclaimer, the term of this patent is extended or adjusted under 35 U.S.C. 154(b) by 0 days.

(21) Appl. No.: 09/804,588

(22) Filed: Mar. 12, 2001

(51) Int. Cl.[7] ................................................ H02G 3/08
(52) U.S. Cl. ........................ 174/50; 174/58; 220/3.7; 439/347
(58) Field of Search .................... 174/50, 58, 48, 174/63, 17 R; 220/3.2, 3.9, 3.7, 3.92, 4.02, 326; 439/61, 77, 67, 501, 445; 312/107, 108, 308, 310, 111; 455/347, 348, 338

(56) References Cited

U.S. PATENT DOCUMENTS

| | | | |
|---|---|---|---|
| 3,904,936 A | * 9/1975 | Hamrick, Jr. et al. | 174/60 |
| 4,337,499 A | 6/1982 | Cronin et al. | 361/386 |
| 4,498,119 A | 2/1985 | Cronin | 361/386 |
| 5,103,378 A | * 4/1992 | Stowers et al. | 439/61 |
| 5,325,270 A | 6/1994 | Wegner et al. | 361/797 |
| 5,389,740 A | * 2/1995 | Austin | 174/67 |
| 5,398,161 A | * 3/1995 | Roy | 361/685 |
| 5,486,113 A | 1/1996 | Lundh | 439/61 |
| 5,600,542 A | 2/1997 | Malgouires | 361/732 |
| 5,715,145 A | 2/1998 | Wong et al. | 361/796 |
| 5,748,451 A | 5/1998 | Thompson et al. | 361/788 |
| 5,781,410 A | * 7/1998 | Keown et al. | 174/52.1 |
| 5,873,738 A | 2/1999 | Shimada et al. | 439/61 |
| 5,901,868 A | * 5/1999 | Fahey et al. | 174/50 |
| 5,912,801 A | * 6/1999 | Roy et al. | 361/678 |
| 6,195,493 B1 | * 2/2001 | Bridges | 385/134 |
| 6,297,958 B1 | * 10/2001 | Lutz, Jr. | 174/52.1 |

* cited by examiner

Primary Examiner—Dean A. Reichard
Assistant Examiner—Angel R. Estrada
(74) Attorney, Agent, or Firm—Baker Botts L.L.P.

(57) ABSTRACT

According to one embodiment of the invention, a method for converting a telecommunication chassis includes providing a telecommunication chassis that includes a housing having a front and a rear, a backplane coupled to the housing, and a cable interface board having an inside surface and an outside surface coupled to the housing adjacent the rear of the housing, the outside surface facing the same general direction as the rear of the housing, and rotating the cable interface board such that the outside surface of the cable interface board faces the same general direction as the front of the housing.

22 Claims, 6 Drawing Sheets

CONVERTIBLE TELECOMMUNICATION CHASSIS AND METHOD FOR CONVERTING SAME

BACKGROUND OF THE INVENTION

Depending on where telecommunication equipment is installed, different telecommunication standards apply. For example, in the United States the main set of telecommunication standards are Network Equipment Building Standards ("NEBS") by Bellcore. In Europe, the main set of standards comes from the European Telecommunication Standards Institute ("ETSI").

Many standards of both NEBS and ETSI coincide; however, many standards differ. For example, in the United States, chassis typically utilize cables exiting the chassis from both the front and the rear of the chassis; therefore, aisle access is supplied from both sides. In Europe chassis require front-sided access only. Accordingly, in Europe telecommunication chassis are placed back-to-back to save space.

These conflicting standards means that two different chassis assemblies are required, one for the United States and one for Europe. This means that telecommunication equipment manufacturers and installers need to support two different chassis. Manufacturing two different chassis assemblies wastes considerable time and money. In addition, having to manufacture two different chassis assemblies causes telecommunication manufacturers to lose some control of inventory.

SUMMARY OF THE INVENTION

The challenges in the field of telecommunications continue to increase with demands for more and better techniques having greater flexibility and adaptability. Therefore, a need has arisen for a convertible telecommunication chassis and method for converting same.

In accordance with the present invention, a convertible telecommunication chassis and method for converting same is provided that addresses disadvantages and problems associated with previously developed chassis and methods.

According to one embodiment of the invention, a method for converting a telecommunication chassis includes providing a telecommunication chassis that includes a housing having a front and a rear, a backplane coupled to the housing, and a cable interface board having an inside surface and an outside surface coupled to the housing adjacent the rear of the housing, the outside surface facing the same general direction as the rear of the housing, and rotating the cable interface board such that the outside surface of the cable interface board faces the same general direction as the front of the housing.

Some embodiments of the invention provide numerous technical advantages. For example, a technical advantage of one embodiment of the present invention is that a convertible telecommunication chassis is manufactured that is capable of conforming to telecommunication standards in both the United States (i.e., NEBS) and Europe (i.e., ETSI). This conversion ability saves considerable time and money because only one chassis needs to be manufactured instead of two. In addition, a telecommunications chassis manufacturer can precisely control inventory with respect to both NEBS chassis and ETSI chassis.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1A through 6 of the drawings, in which like numerals refer to like parts.

Figure 1A:
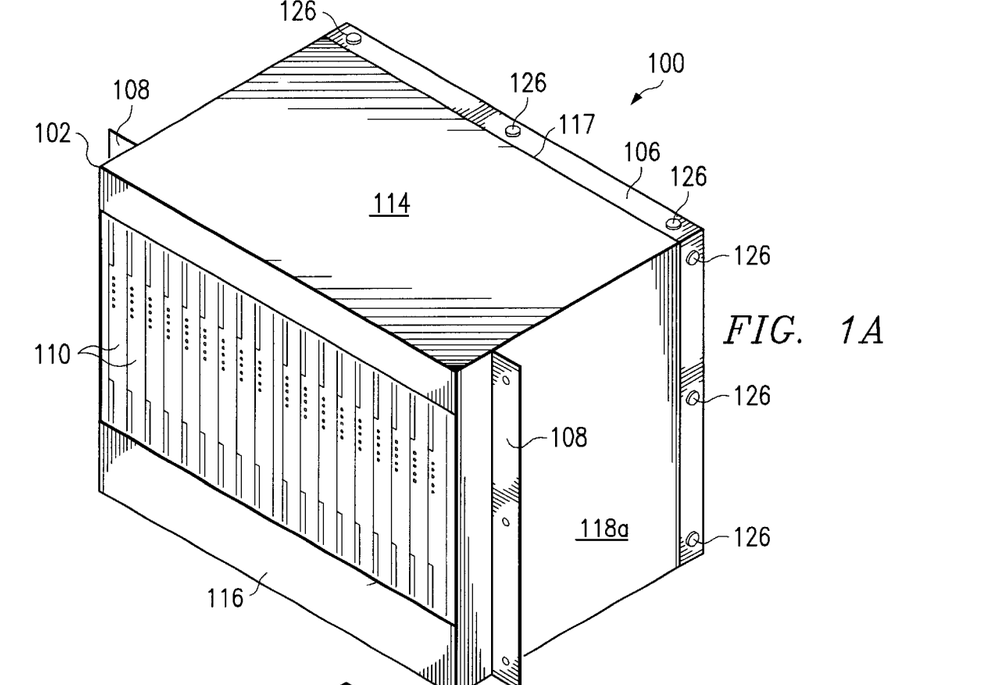
FIGS. 1A and 1B are front and rear perspective views, respectively, of one embodiment of a convertible telecommunication chassis illustrating the telecommunication chassis in a configuration that conforms to telecommunication standards in the United States.
Figure 1B:
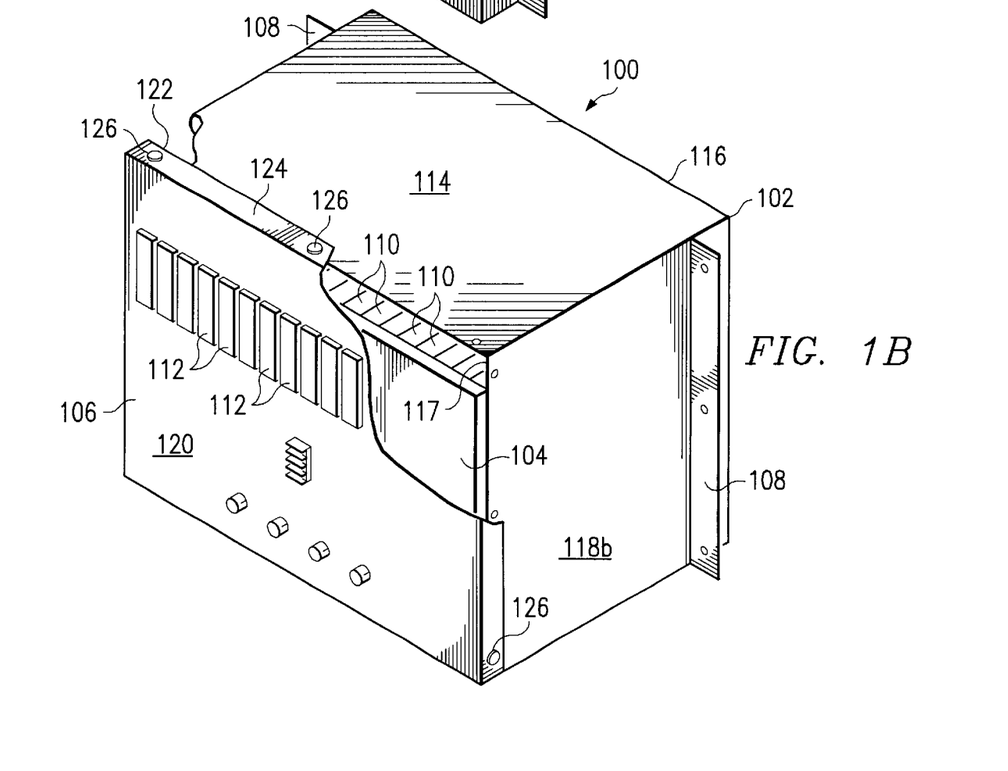
Figure 2:
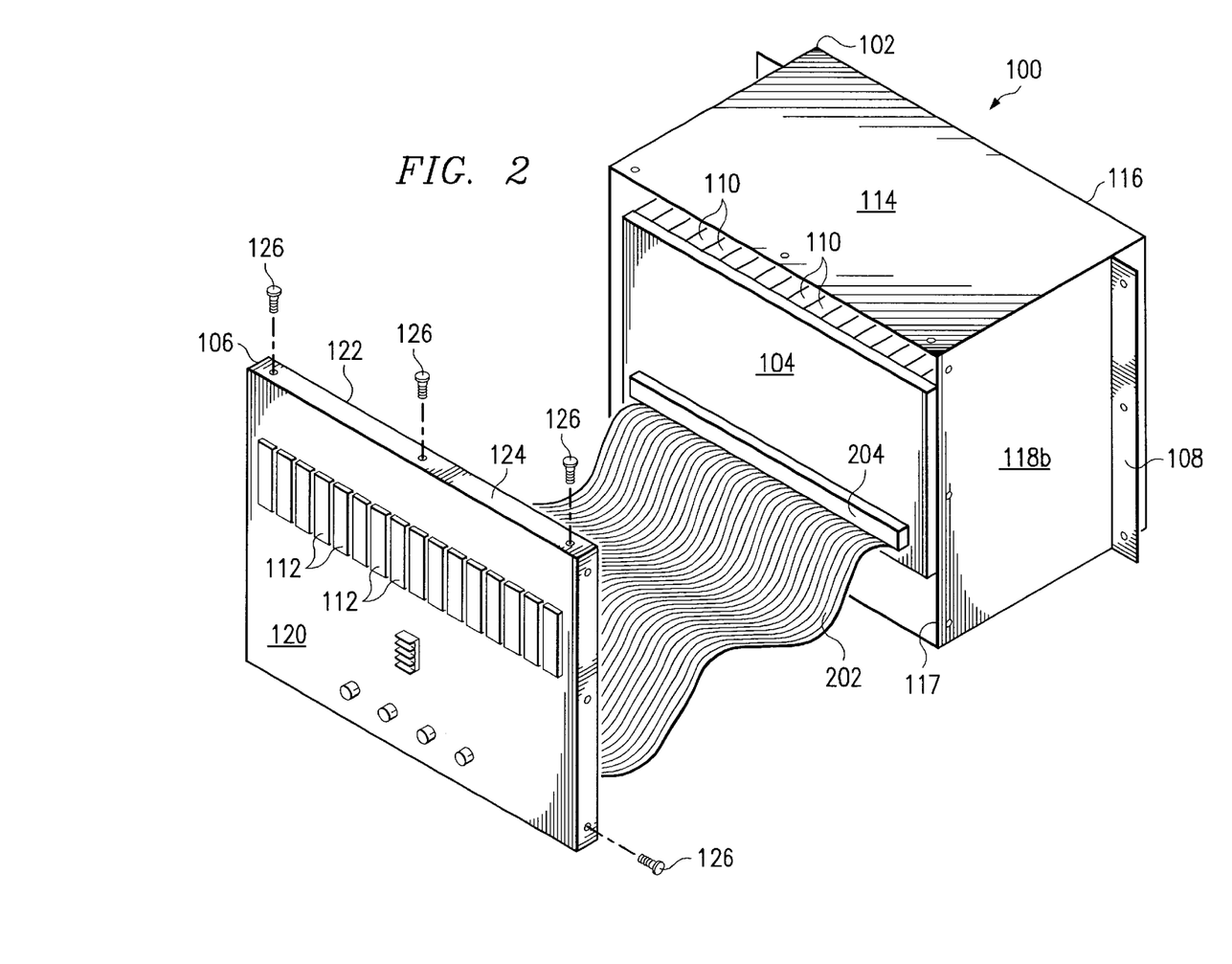
FIG. 2 is a rear perspective view of the convertible telecommunication chassis of FIGS. 1A and 1B showing one embodiment of a cable interface board physically decoupled from the convertible telecommunication chassis.
Figure 3A:
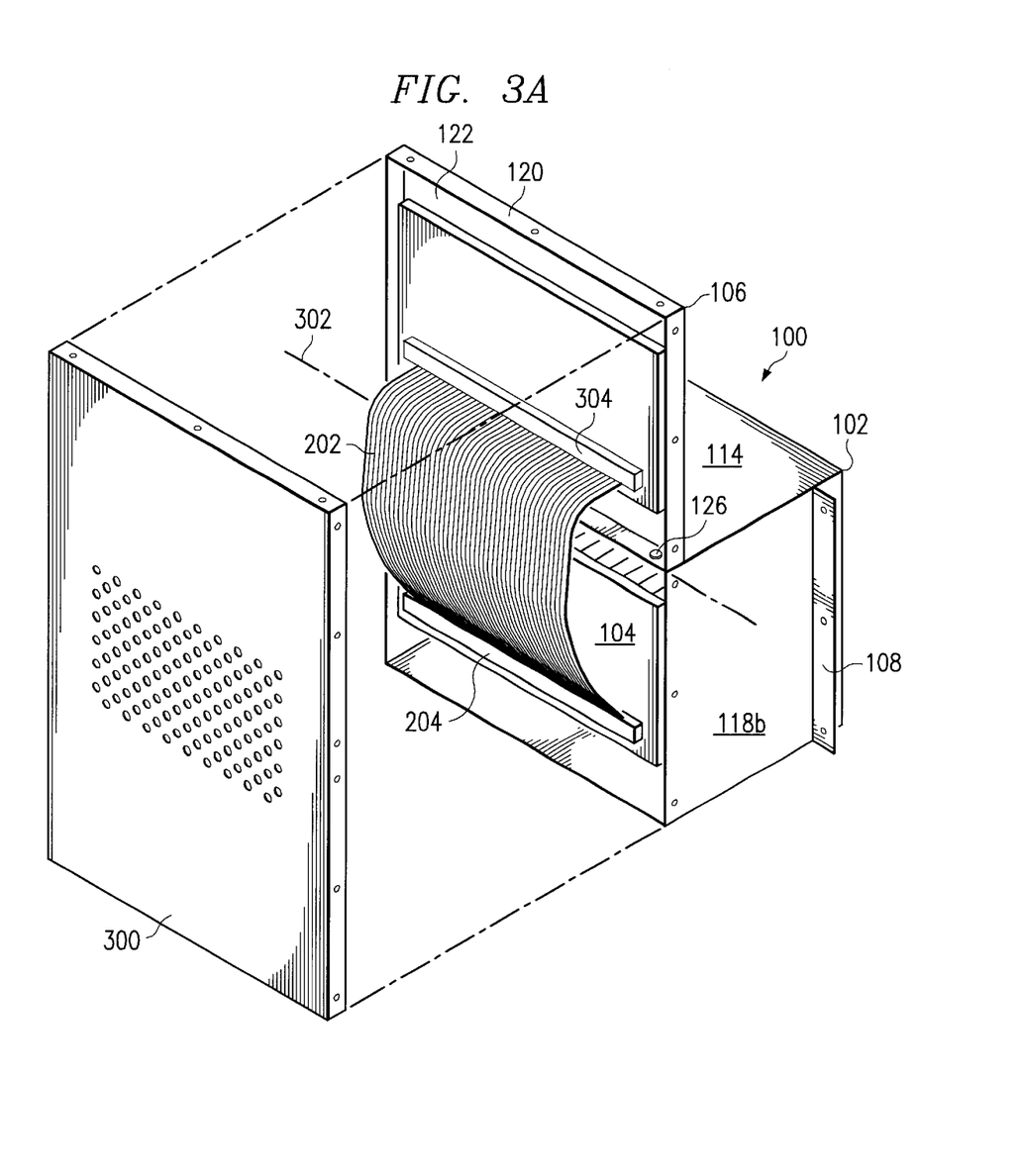
FIG. 3A is a rear perspective view of the convertible telecommunication chassis of FIGS. 1A and 1B showing the cable interface board rotated approximately 180 degrees upward and coupled to the top of the telecommunication chassis.
Figure 3B:
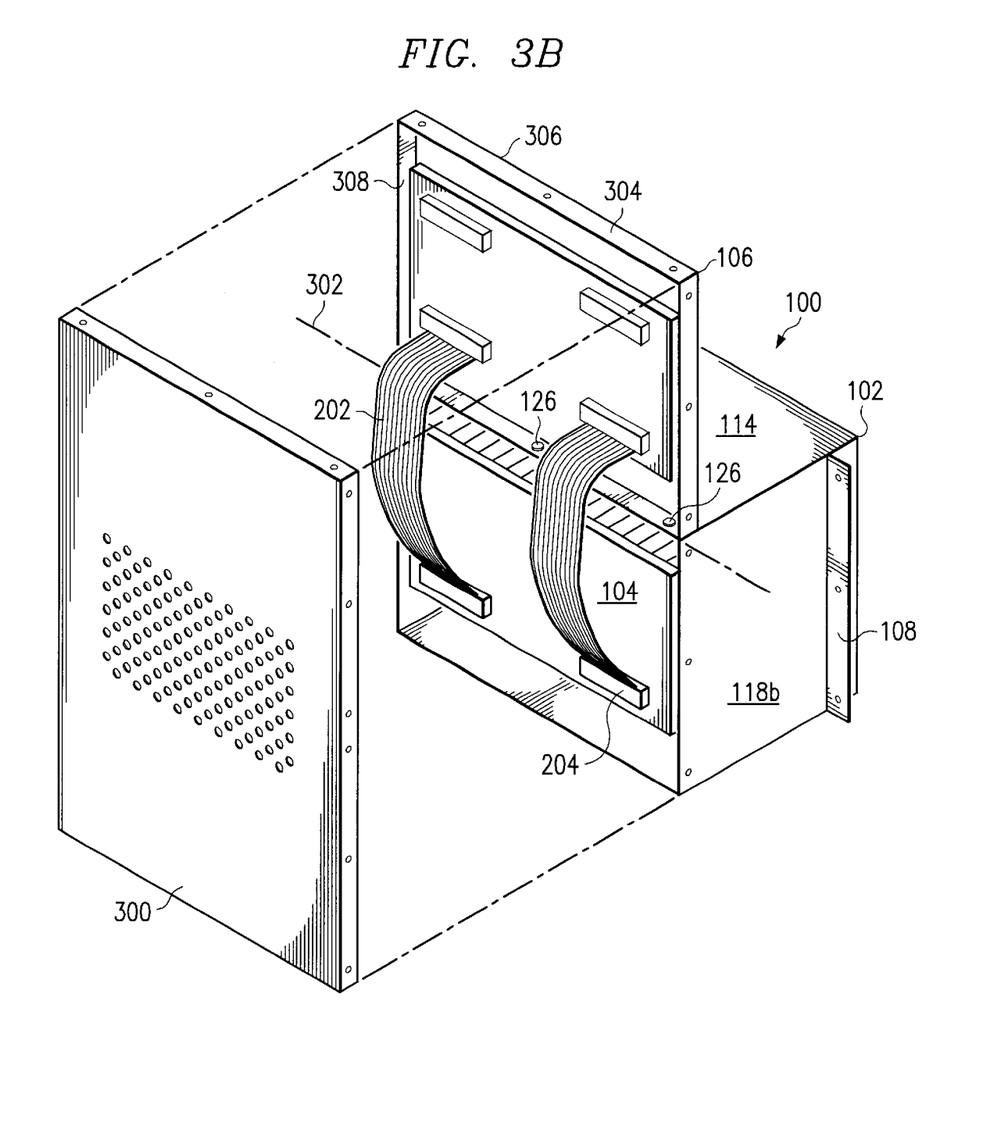
FIG. 3B is a rear perspective view of the convertible telecommunication chassis of FIGS. 1A and 1B showing a second cable interface board coupled to the top of the telecommunication chassis.
Figure 4:
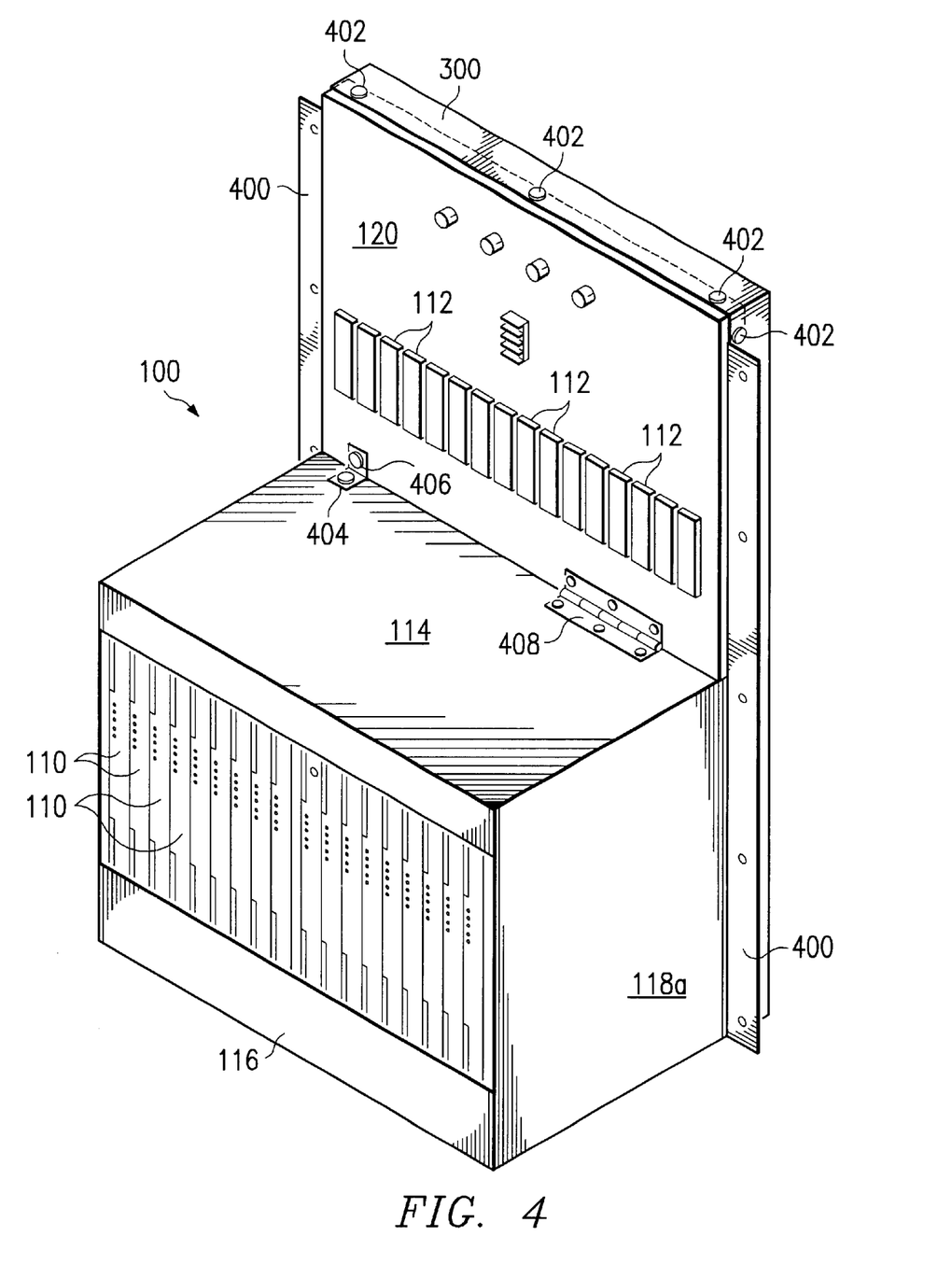
FIG. 4 is a front perspective view of the convertible telecommunication chassis of FIGS. 1A and 1B illustrating the telecommunication chassis in a configuration that conforms to telecommunication standards in Europe.

FIGS. 1A and 1B are front and rear perspective views, respectively, of one embodiment of a convertible telecommunication chassis 100 illustrating chassis 100 in a configuration that conforms to telecommunication standards in the United States. These telecommunication standards are Network Equipment Building Standards ("NEBS") by Bellcore. According to NEBS, chassis can have cables extending from both the front and the rear of chassis while installed in an equipment rack. This facilitates aisle access to both the front and the rear of chassis. In Europe, however, equipment racks are stacked back-to-back and, according to the European Telecommunications Standards Institute ("ETSI"), no cables may either enter or exit from the rear of chassis. Therefore, manufacturers of telecommunication chassis manufacture two different chassis, one that conforms to NEBS and one that conforms to ETSI. The manufacturing of two separate chassis wastes considerable time and money, and also adds to inventory headaches. Chassis 100, according to the teachings of the present invention, addresses these problems and others. In FIGS. 2 through 4 below, a method for converting chassis 100 from a chassis that conforms to NEBS into a chassis that conforms to ETSI is illustrated.

Referring to FIGS. 1A and 1B, chassis 100, in one embodiment, houses a digital subscriber line access multiplexer; however, chassis 100 may house other telecommunication devices, such as a voice switch or a DAX. Chassis 100 includes housing 102, a backplane 104, a cable interface board 106, and a pair of mounting ears 108.

Housing 102 is a structure that houses the components of chassis 100 and is typically formed from a metal; however, housing 102 may be formed from other suitable materials. In one embodiment, housing 102 is rectangularly shaped as shown in FIGS. 1A and 1B and includes a top 114, a front 116, a rear 117, and sides 118a, 118b.

Backplane 104 serves as an interface between a plurality of circuit cards 110 and communication signals from cables (not shown) that carry communication signals. Typically, backplane 104 has routing formed therein for routing the communication signals to appropriate circuit cards 110. This routing inside backplane 104 usually consists of many conductive traces within multiple layers; however, backplane 104 may also be formed from a single layer of material. Backplane 104 is coupled to housing 102 in any suitable manner and is typically coupled to housing 102 near rear 117.

Circuit cards 110 may be network interface cards or other suitable cards used to implement the function of chassis 100. For example, circuit cards 110 may be twenty-four port or forty-eight port DSL interface cards. Circuit cards 110 have connectors (not explicitly shown) for coupling circuit cards 110 to backplane 104.

Cable interface board 106 accepts cables via connectors 112 and routes the communication signals in the cables to appropriate connectors on backplane 104. Cable interface board 106 allows a physical conversion of different types of connectors or ports between cable interface board 106 and backplane 104. In other words, different cable interface boards 106 can be used for different external connector requirements. For example, if cable interface board 106 has ethernet ports, then these ethernet ports are electrically connected through a flexible connector 202 (FIG. 2) to backplane 104.

Cable interface board 106 includes an outside surface 120, an inside surface 122, and a top edge 124. Outside surface 120 faces the same general direction as rear 117 of housing 102. Therefore, when chassis 100 conforms to NEBS cables extend from the rear of chassis 100 and aisle access is provided to rear 117 of chassis 100. Cable interface board 106 is coupled to housing 102 in any suitable manner, such as with a plurality of fasteners 126. In one particular embodiment, cable interface board 106 is hinged to housing 102 along top edge 124 (not shown in FIGS. 1A and 1B). Cable interface board 106 may be either a passive board or active board.

Connectors 112 are any suitable connectors, such as Champ® connectors or other standard connectors well known in the art of telecommunications.

Mounting ears 108 are for installing chassis 100 into an equipment rack. Mounting ears 108 are typically made of steel, aluminum, or other metal, but may be formed from any suitable material. Because mounting ears 108 are used to mount chassis 100 in an equipment rack, mounting ears 108 are usually coupled to sides 118a, 118b of housing 102.

A method for converting chassis 100 from a NEBS-conforming chassis to a ETSI-conforming chassis is illustrated below in FIGS. 2 through 4.

FIG. 2 is a rear perspective view of chassis 100 showing cable interface board 106 physically decoupled from chassis 100 according to one embodiment of the present invention. In one embodiment, cable interface board 106 is coupled to housing 102 with fasteners 126. Therefore, to decouple cable interface board 106 from housing 102 fasteners 126 are removed. In an embodiment where cable interface board 106 is also hinged to housing 102 (see FIG. 4), cable interface board 106 stays physically coupled to housing 102 along top edge 124 but is free to rotate about an axis that coincides with top edge 124. In this embodiment, there may be fasteners 126 along the sides or bottom of cable interface board 106 that need to be removed. Other methods of coupling and de-coupling cable interface board 106 from housing 102 may be employed. FIG. 2 also shows cable interface board 106 electrically coupled to backplane 104 via flexible connector 202 and backplane connectors 204.

Flexible connector 202 electrically couples connectors on cable interface board 106 (not explicitly shown) to backplane connectors 204. In one embodiment, flexible connector 202 is a ribbon cable; however, flexible connector 202 may be other suitable types of connectors, such as a flex cable, discrete cables, or a two-piece connector system.

Backplane connectors 204 function to route incoming communication signals from cables to circuit cards 110 as described above. In one embodiment, backplane connectors 204 are flex cable connectors; however, backplane connectors 204 may be other suitable types of connectors.

After decoupling cable interface board 106 from housing 102, cable interface board 106 is rotated such that outside surface 120 of cable interface board 106 faces the same general direction as front 116 of housing 102 as described below and illustrated in FIGS. 3A and 3B.

FIG. 3A is a rear perspective view of chassis 100 showing cable interface board 106 rotated approximately 180 degrees upward and coupled to top 114 of chassis 100. In this embodiment, cable interface board 106 is pivoted around an axis 302 that coincides with top edge 124 of cable interface board 106. Thus, outside surface 120 of cable interface board 106 faces the same general direction as front 116 of housing 102. In this embodiment, cable interface board 106 is coupled to top 114 of housing 102; however, in other embodiments, cable interface board 106 is coupled to sides 118a, 118b, a bottom of housing 102, or other suitable location. As shown, cable interface board 106 is coupled to housing 102 with fasteners 126; however, other suitable connectors may be used. For example, a bracket 404 with fasteners 406 (see FIG. 4) may be used or a hinge 408 may be used (see FIG. 4).

FIG. 3A also illustrates a cover plate 300, which is discussed below, and an electrical connection between cable interface board 106 and backplane 104 similar to that shown in the previous figures. In one embodiment, cable interface board 106 is rotated while maintaining the electrical coupling between cable interface board 106 and backplane 104; however, the electrical connection may be made after cable interface board 106 is rotated. In addition, other electrical coupling methods between cable interface board 106 and backplane 104 may be utilized other than the original coupling method after rotating cable interface board 106. In addition to that shown in FIG. 3A, a different cable interface board may be coupled to housing 102 as illustrated in FIG. 3B.

FIG. 3B is a rear perspective view of chassis 100 showing a second cable interface board 304 coupled to top 114 of chassis 100. Second cable interface board 304 is coupled to top 114 such that a surface 306 of second cable interface board 304 faces the same general direction as front 116 of housing 102. Surface 306 of second cable interface board 304 is operable to accept at least one incoming or outgoing cable.

Second cable interface board 304 is similar to cable interface board 106 in that second cable interface board 304 accepts cables via connectors and routes them to appropriate connectors on backplane 104 as illustrated in FIG. 3B. In one embodiment, second cable interface board 304 is a passive board; however, second cable interface board 304 may be an active board with conductive traces formed therein. Second cable interface board 304 is shown in FIG. 3B to be coupled to top 114 of housing 102. However, second cable interface board 304, like cable interface board 106, may be coupled to sides 118a, 118b, a bottom of housing 102, or other suitable location. Second cable interface board 304 is coupled to housing 102 in any suitable manner, such as fasteners 126, bracket 404 with fasteners 406 (FIG. 4) or hinge 408 (FIG. 4). Second cable interface board 304 is electrically coupled to backplane 104 with any suitable connectors.

Surface 306 of second cable interface board 304 has connectors (not shown) that accepts incoming cables to route to backplane 104. Any suitable connectors may be used to accept the cables.

Referring to both FIGS. 3A and 3B, cover plate 300 is illustrated. Cover plate 300 covers rear 117 of housing 102 and inside surface 120 of cable interface board 106 (or surface 308 of second cable interface board 304) to protect the electrical components of chassis 100 and also to act as a "Faraday" cage to inhibit electromagnetic emissions from chassis 100. Cover plate 300 is coupled in any suitable manner, such as with fasteners 402 as shown best in FIG. 4.

FIG. 4 is a front perspective view of chassis 100 illustrating chassis 100 in a configuration that conforms to ETSI standards. In Europe, all cables are required to enter or exit from front 116 of chassis 100 per ETSI requirements. To complete chassis 100 in ETSI configuration, a pair of European mounting ears 400 are coupled to chassis 100 as shown in FIG. 4. European mounting ears 400 are coupled to chassis 100 in any suitable manner, such as with fasteners. This completes the conversion of chassis 100 from a NEBS-conforming chassis to an ETSI-conforming chassis. Having the ability to convert a chassis that conforms to two telecommunication standards results in a number of technical advantages. For example, a convertible telecommunication chassis saves considerable time and money because only one chassis needs to be manufactured instead of two or more.

Additionally, a telecommunication chassis manufacturer can better control inventory.

Figure 5:
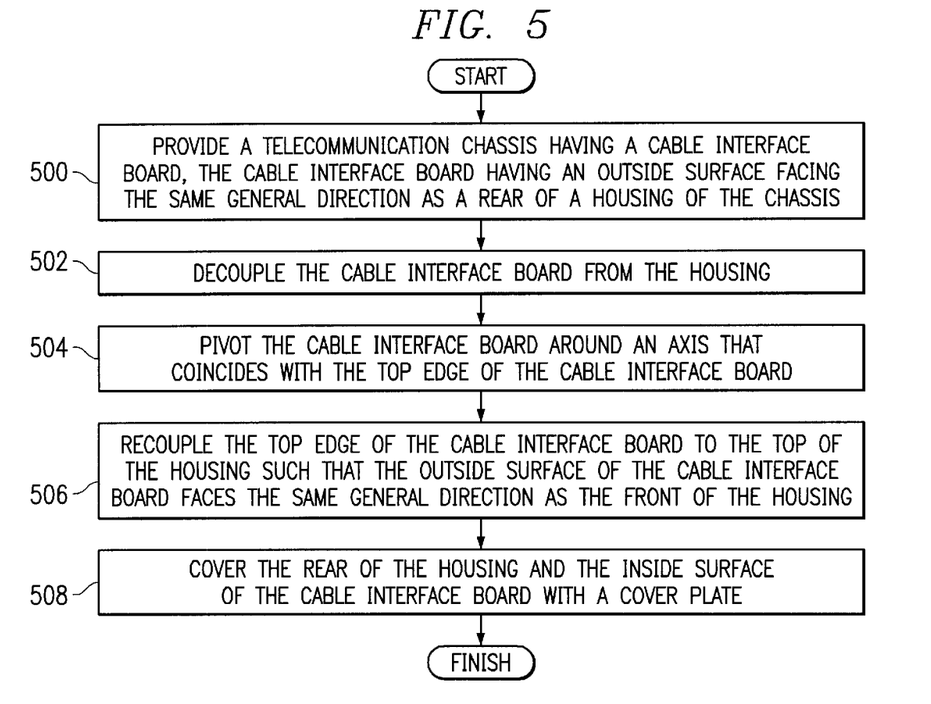
FIG. 5 is a flowchart illustrating a method for converting a telecommunication chassis according to one embodiment of the present invention.

FIG. 5 is a flowchart illustrating a method for converting chassis 100 according to one embodiment of the present invention. Chassis 100 is provided at step 500. As mentioned previously, chassis 100 includes housing 102 having top 114, front 116, and rear 117. Chassis 100 further includes backplane 104 coupled to housing 102, and cable interface board 106 coupled adjacent rear 117 of housing 102. Cable interface board 106 has top edge 124, inside surface 122, and outside surface 120 that faces the same general direction as rear 117 of housing 102. Cable interface board 106 is decoupled from housing 102 at step 502. Cable interface board 106 is pivoted around an axis that coincides with top edge 124 of cable interface board 106 at step 504. Top edge 124 of cable interface board 106 is recoupled to top 114 of housing 102 at step 506, such that outside surface 120 or cable interface board 106 faces the same general direction as front 116 of housing 102. Rear 117 of housing 102 and inside surface 122 of cable interface board 106 is covered with cover plate 300 at step 508, thereby completing one method of converting chassis 100.

Figure 6:
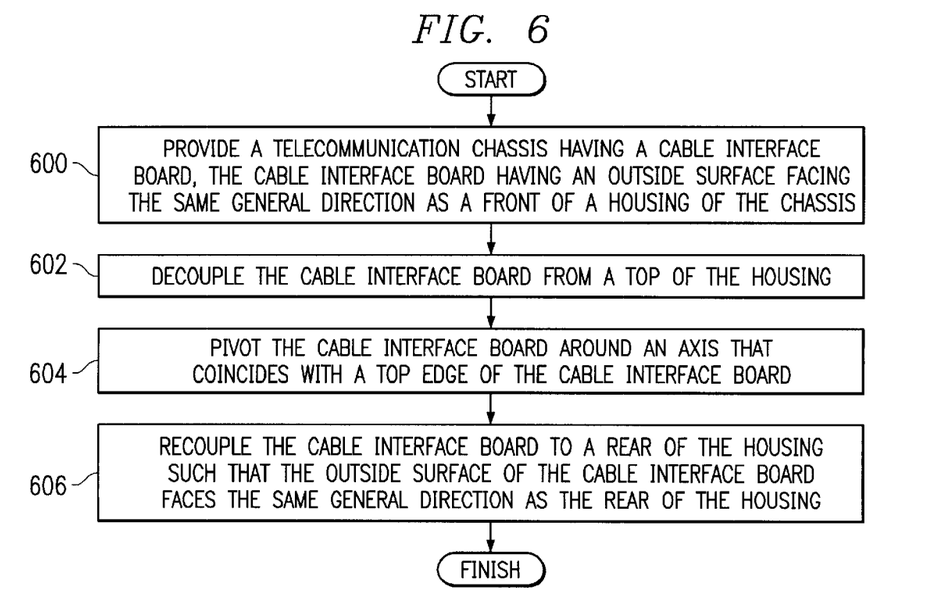
FIG. 6 is a flowchart illustrating an alternative method for converting a telecommunication chassis according to one embodiment of the present invention.

FIG. 6 is a flowchart illustrating an alternative method for converting chassis 100 according to one embodiment of the present invention. Chassis 100 is provided at step 600. As mentioned previously, chassis 100 includes housing 102 having top 114, front 116, and rear 117. Chassis 100 further includes backplane 104 coupled to housing 102, and cable interface board 106 extending upwardly from top 114 of housing 102 and coupled with a plurality of fasteners 126 adjacent rear 117 of housing 102. Cable interface board 106 has top edge 124, inside surface 122, and outside surface 120 that faces the same general direction as front 116 of housing 102. Cable interface board 106 is decoupled from top 114 of housing 102 at step 602. Cable interface board 106 is pivoted around an axis that coincides with top edge 124 of cable interface board 106 at step 604. Cable interface board 106 is recoupled to rear 117 of housing 102 at step 606, such that outside surface 120 or cable interface board 106 faces the same general direction as rear 117 of housing 102. This completes one method of converting chassis 100 from an ETSI-conforming chassis to a NEBS-conforming chassis.

Although embodiments of the invention and their advantages are described in detail, a person skilled in the art could make various alternations, additions, and omissions without departing from the spirit and scope of the present invention as defined by the appended claims.

What is claimed is:

1. A method for converting a telecommunication chassis, comprising:
    providing a telecommunication chassis comprising:
        a housing having a front and a rear;
        a backplane coupled to the housing; and
        a cable interface board having an inside surface and an outside surface coupled to the housing adjacent the rear of the housing, the outside surface facing the same general direction as the rear of the housing; and
    rotating the cable interface board such that the outside surface of the cable interface board faces the same general direction as the front of the housing.

2. The method of claim 1, further comprising covering the rear of the housing and the inside surface of the cable interface board with a cover plate.

3. The method of claim 1, further comprising coupling a pair of mounting ears on the housing.

4. The method of claim 1, further comprising electrically coupling the cable interface board and the backplane, and, wherein rotating the cable interface board comprises rotating the cable interface board such that the outside surface of the cable interface board faces the same general direction as the front of the housing while maintaining the electrical coupling between the cable interface board and the backplane.

5. The method of claim 1, wherein rotating the cable interface board comprises:
    decoupling the cable interface board from the housing;
    rotating the cable interface board; and
    recoupling the cable interface board to a top of the housing such that the outside surface of the cable interface board faces the same general direction as the front of the housing.

6. The method of claim 1, wherein rotating the cable interface board comprises pivoting the cable interface board around an axis that coincides with a top edge of the cable interface board.

7. The method of claim 6, wherein pivoting the cable interface board around the axis that coincides with the top edge of the cable interface board comprises pivoting the cable interface board around an axis of a hinge coupled between the top edge of the cable interface board and a top of the housing.

8. A method for converting a telecommunication chassis, comprising:
- providing a telecommunication chassis comprising:
  - a housing having a top, a front, and a rear;
  - a backplane coupled to the housing; and
  - a cable interface board coupled to the housing adjacent the rear of the housing, the cable interface board having an inside surface, an outside surface, and a top edge, the outside surface facing the same general direction as the rear of the housing;
- decoupling the cable interface board from the housing;
- pivoting the cable interface board around an axis that coincides with the top edge of the cable interface board;
- recoupling the top edge of the cable interface board to the top of the housing such that the outside surface of the cable interface board faces the same general direction as the front of the housing; and
- covering the rear of the housing and the inside surface of the cable interface board with a cover plate.

9. The method of claim 8, further comprising coupling a pair of mounting ears on the housing.

10. The method of claim 8, further comprising electrically coupling the cable interface board and the backplane, and, wherein the decoupling, pivotry, and recoupling comprise:
- decoupling the cable interface board from the housing while maintaining the electrical coupling between the cable interface board and the backplane,
- pivoting the cable interface board around an axis that coincides with the top edge of the cable interface board while maintaining the electrical coupling between the cable interface board and the backplane,
- recoupling the top edge of the cable interface board to the top of the housing such that the outside surface of the cable interface board faces the same general direction as the front of the housing while maintaining the electrical coupling between the cable interface board and the backplane, and
- covering the rear of the housing and the inside surface of the cable interface board with a cover plate while maintaining the electrical coupling between the cable interface board and the backplane.

11. The method of claim 8, wherein pivoting the cable interface board around the axis that coincides with the top edge of the cable interface board comprises pivoting the cable interface board around an axis of a hinge coupled between the top edge of the cable interface board and the top of the housing.

12. A convertible telecommunication chassis, comprising:
- a housing having a top, a front, and a rear;
- a backplane coupled to the housing; and
- a cable interface board extending upwardly from the top of the housing and coupled with a plurality of connectors to the top of the housing adjacent the rear of the housing, the cable interface board having an inside surface and an outside surface facing the same general direction as the front of the housing.

13. The telecommunication chassis of claim 12, further comprising a cover plate coupled to the rear of the housing and the inside surface of the cable interface board.

14. The telecommunication chassis of claim 12, wherein the housing is operable to accept a pair of mounting ears.

15. The telecommunication chassis of claim 12, further comprising a hinge coupled between the cable interface board and the top of the housing.

16. The telecommunication chassis of claim 12, further comprising:
- at least one bracket coupled to the top of the housing, the bracket having an aperture formed therein; and
- a fastener operable to couple the cable interface board to the bracket.

17. A method for converting a telecommunication chassis, comprising:
- providing a telecommunication chassis comprising:
  - a housing having a top, a front, and a rear;
  - a backplane coupled to the housing; and
  - a cable interface board extending upwardly from the top of the housing and coupled with a plurality of connectors to the top of the housing adjacent the rear of the housing, the cable interface board having an inside surface and an outside surface facing the same general direction as the front of the housing; and
- rotating the cable interface board such that the outside surface of the cable interface board faces the same general direction as the rear of the housing.

18. The method of claim 17, further comprising coupling a pair of mounting ears on the housing.

19. The method of claim 17, further comprising electrically coupling the cable interface board and the backplane, and, wherein rotating the cable interface board comprises rotating the cable interface board such that the outside surface of the cable interface board faces the same general direction as the rear of the housing while maintaining the electrical coupling between the cable interface board and the backplane.

20. The method of claim 17, wherein rotating the cable interface board comprises:
- decoupling the cable interface board from the top of the housing;
- rotating the cable interface board; and
- recoupling the cable interface board to the rear of the housing such that the outside surface of the cable interface board faces the same general direction as the rear of the housing.

21. The method of claim 17, wherein rotating the cable interface board comprises pivoting the cable interface board around an axis that coincides with a top edge of the cable interface board.

22. The method of claim 21, wherein pivoting the cable interface board around the axis that coincides with the top edge of the cable interface board comprises pivoting the cable interface board around an axis of a hinge coupled between the top edge of the cable interface board and a top of the housing.

* * * * *